(12) United States Patent
Hollier et al.

(10) Patent No.: US 8,126,869 B2
(45) Date of Patent: Feb. 28, 2012

(54) AUTOMATED CLIENT SITEMAP GENERATION

(75) Inventors: Ian V. Hollier, Ket, WA (US); Martina Hiemstra, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 12/028,502

(22) Filed: Feb. 8, 2008

(65) Prior Publication Data

US 2009/0204638 A1 Aug. 13, 2009

(51) Int. Cl.
G06F 7/00 (2006.01)

(52) U.S. Cl. ........ 707/709; 707/707; 707/711; 707/712; 707/713; 707/722; 707/736; 707/758; 707/781; 709/218; 709/223; 709/224

(58) Field of Classification Search .................. 707/707, 707/709, 711, 712, 713, 722, 736, 758, 781, 707/999.003, 999.004, 999.005; 709/218, 709/223, 224
See application file for complete search history.

(56) References Cited

U.S. PATENT DOCUMENTS

| | | | |
|---|---|---|---|
| 6,516,337 B1 * | 2/2003 | Tripp et al. | 709/202 |
| 6,525,748 B1 | 2/2003 | Belfiore | |
| 6,957,383 B1 | 10/2005 | Smith | |
| 7,599,920 B1 * | 10/2009 | Fox et al. | 1/1 |
| 2004/0267739 A1 | 12/2004 | Dowling | |
| 2006/0070004 A1 | 3/2006 | Miller | |
| 2006/0101330 A1 | 5/2006 | Godley | |
| 2007/0050338 A1 | 3/2007 | Strohm | |
| 2007/0124506 A1 | 5/2007 | Brown | |
| 2007/0244883 A1 | 10/2007 | Bessieres | |

FOREIGN PATENT DOCUMENTS

EP   1840765 A1   3/2007
WO   2007092373 A2   8/2007

OTHER PUBLICATIONS

Author: Kaushal Sheth Title: Google Sitemaps FAQ (Sitemap Issues and Errors) Date: Sep. 25, 2007 Publisher: http://www.arnebranch-hold.de/2006/04/07/google-sitemaps-faq-issues-errors-and-problems Pertinent pp. 18.*
Automating Sitemap Generation; http://www.devarticles.com/index2.php?option=content&do_pdf=1&id=1001.
Automapit, The Key to Healthy Websites; http://www.automapit.com/howitworks.html.
Build Your Site Map Online; http://www.xml-sitemaps.com/.
Sitemap Writer; http://www.dirfile.com/sitemap_writer.htm.

* cited by examiner

Primary Examiner — Syling Yen
(74) Attorney, Agent, or Firm — Shook Hardy & Bacon LLP (57) ABSTRACT

Methods and computer-storage media for automated generation of domain sitemap files are provided. A universal resource locator (URL) for a web site having a plurality of web pages associated therewith is received. Log files and permission controls are analyzed to ascertain whether each web page has been previously crawled and which web pages may be crawled and/or indexed. The permitted, not-previously-crawled web pages are subsequently crawled and the relational structure of the web site is ascertained. Other items of metadata, such as web page modification frequency or priority values, also are determined. Once the structure and metadata are available, a current sitemap is generated that provides the hierarchy and related details in the form of metadata. The sitemap file is then written to a disk and may then be sent to search engines as generated or in a compressed format.

14 Claims, 6 Drawing Sheets

AUTOMATED CLIENT SITEMAP GENERATION

BACKGROUND

The proliferation of the web pages available on the Internet has produced striations in production quality and complexity among web sites. Web sites for individuals and very small businesses can be fairly simple, with few hierarchical levels and relatively static "structures." Some content changes may be of minor significance to the structure of the site and may not necessitate changes to the associated sitemap. Extensive changes create different issues. Budgets may be limited or resources scarce enough that business owners act as their own webmasters. Therefore, overhauling structure and creating a need for a new sitemap is cost-prohibitive from a resource standpoint. This can be contrasted with large businesses that may have enormous web sites with significant complexity. These undertakings are generally tackled with much larger financial wherewithal. Some manifestations include entire departments dedicated to only the web upkeep function. Other companies may outsource such flexibility, but at an expense. Thus, web sites that do undergo large-scale modification either have dedicated staff or adequate resources to document the changes. For those web sites falling in between, complexity accompanying adaptability may be required without the resources to properly document the modifications.

SUMMARY

Embodiments of the present invention relate to methods, systems, and computer-storage media for automated generation of a sitemap for a web site. A universal resource locator (URL) for a web site is received, the web site having a plurality of web pages with which it is associated, that is, web pages having the same domain as the web site URL. Log files are analyzed to ascertain whether each web page has been previously crawled. Other files, downloaded from the root site, contain permission controls and are analyzed to determine which web pages may be crawled and/or indexed. The permitted, not-previously-crawled web pages are subsequently crawled and the structure of the web site, that is the linking of the pages between one another, is ascertained. Other items of metadata, such as web page modification frequency or priority values, also are determined. Once the structure and metadata are available, a current sitemap is generated that provides the hierarchy and related details in the form of metadata. The sitemap file is then written to a disk and may then be sent to search engines as generated or in a compressed format. Certain embodiments can implement the generation of a new sitemap any time the web site is modified.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer storage media having computer-executable instructions embodied thereon that, when executed, perform methods for generating a sitemap file for a web site in an automated manner. Upon receiving an indication for a web site or universal resource locator (URL) domain, server log files are analyzed in conjunction with the present web site structure being crawled. Specified files denote the permissible pages to crawl and crawling occurs in accordance with such permissions. Once the web site structure (i.e., the relational structure of web pages having the same domain as the web site URL) has been determined, items of metadata such as web page priority ranking and modification frequency are automatically determined, that is, without user intervention, for each web page comprising the structure. Determined values may be modified manually if desired, or compared with previous sitemap files and server log files to refine values. The web site structure and metadata are subsequently used to generate a sitemap file for the web site. In embodiments, the sitemap file may be sent to one or more specified search engines. Embodiments further provide for compression of the sitemap file prior to transmission to a search engine if needed. Additionally, embodiments provide for an updated sitemap file to be generated each time a web page having the same domain as the web site URL is modified.

Having briefly described an overview of embodiments of the present invention, an exemplary operating environment suitable for implementing embodiments hereof is described below.

Figure 1:
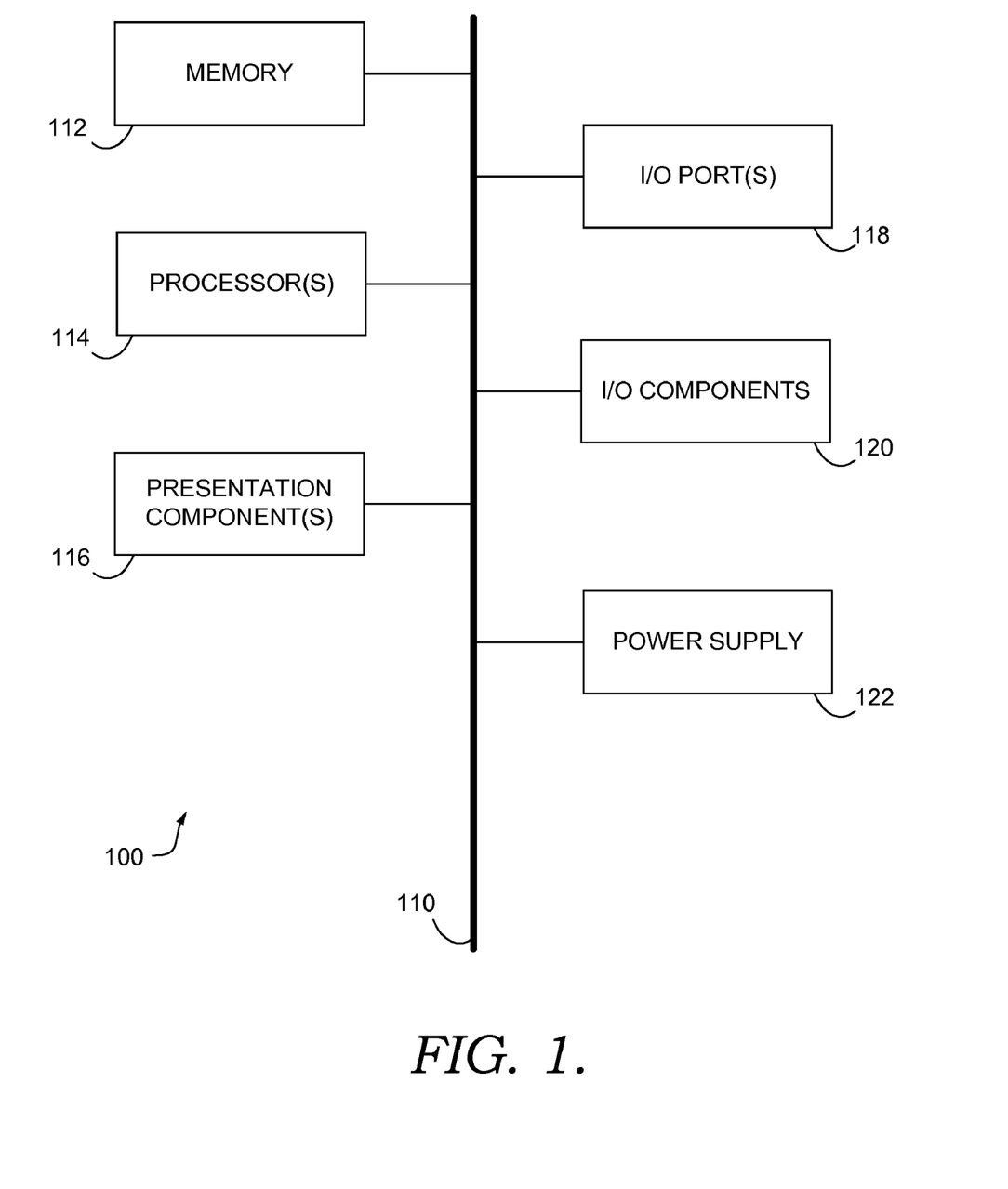
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/modules illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

Figure 2:
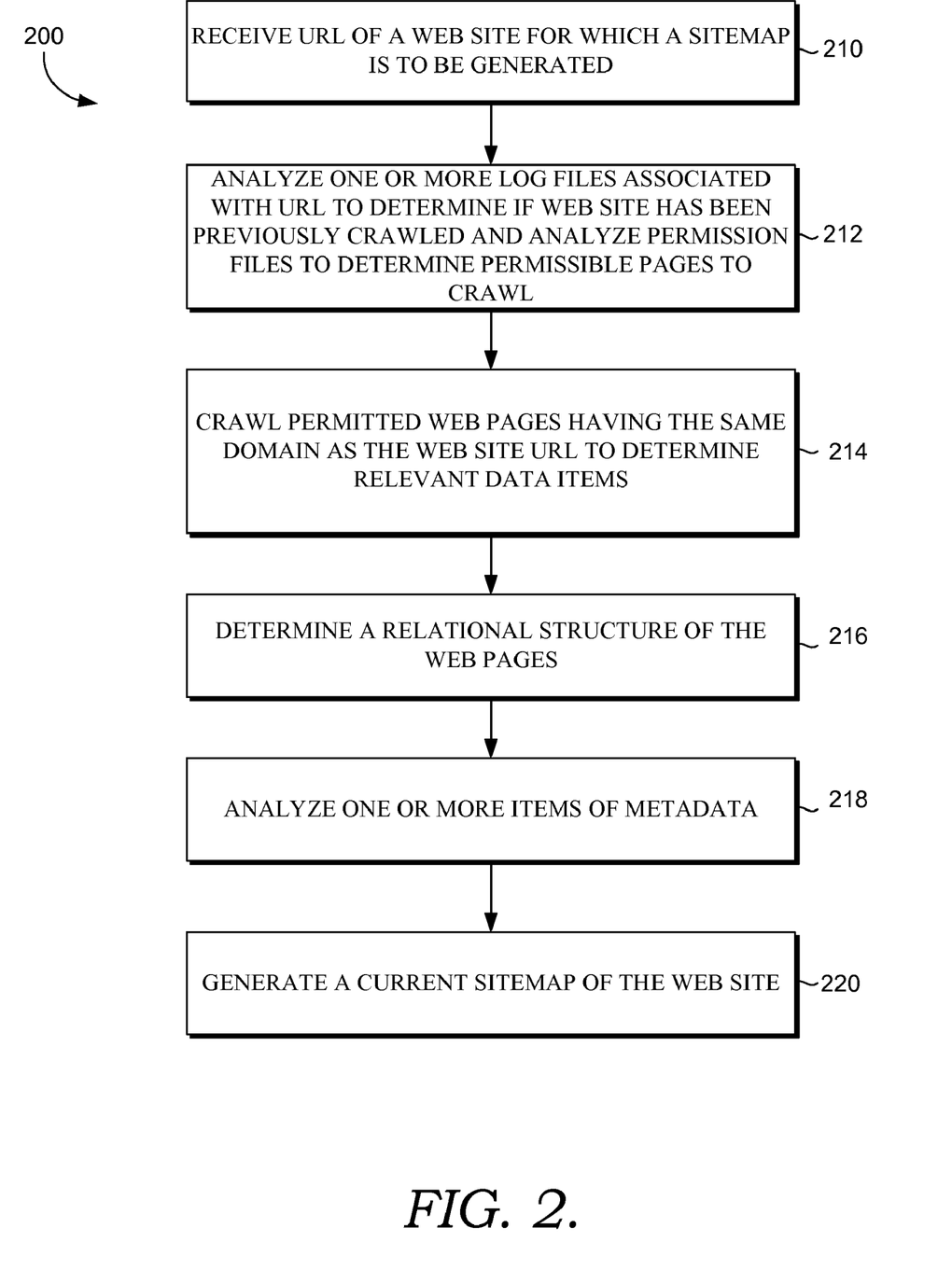
FIG. 2 is a flowchart of a method suitable for generating a current sitemap of a web site, in accordance with an embodiment of the present invention.

Turning now to FIG. 2, a flow chart illustrating a method, in accordance with an embodiment hereof, for automated sitemap file generation for a web site in accordance with the web site URL, is shown and designated generally as reference numeral 200. Initially, as indicated at block 210, a web site for which a sitemap is to be generated is received. Generally, such receipt comprises receiving the URL for the web site, although it will be understood by those of ordinary skill in the art that any web site identifier from which the web site URL may be ascertained may be received in accordance with embodiments hereof. Utilizing the web site URL domain, a sitemap file is generated, as more fully described below, based upon those web pages having the same domain as the web site URL. As an example, if the web site for generating a sitemap had a domain name of www.mywebsite.com, the sitemap file generation would be limited to web pages that have this specific root domain, such as www.mywebsite.com/index or www.mywebsite.com/faqs.html, etc. Any pages linked to the root domain that differ in domain name will not be included in the sitemap file generated. Thus, in the above example, if a page was linked to www.archive.mywebsite.com, then the sitemap generation would not include this page or related links.

Once the root domain is specified, one or more files are analyzed, as indicated at block 212. Initially, the web server logs, that is files that log user visits to web pages based on respective URLs, are analyzed to discover those URLs that haven't previously been crawled. By scanning the web server logs, a list of URLs is built from which to seed the crawler. Each URL in the log file is examined and compared to a list of URLs already present in the corresponding data structure. If the URL is a URL that is not in the data structure, it is added. Upon completion of this process, a list of URLs that act as a starting point for the crawler is generated.

In embodiments, analysis of the files as indicated at block 212 may include not only analysis to discover those URLs that haven't previously been crawled but analysis of several different types of files which are capable of being examined for different forms of information. By way of example, and not limitation, the log files may be analyzed to determine the number of visits a particular web page has received. Likewise, the log files may be analyzed to determine a total number of log file entries, that is, a total number of visits to any URL logged in the log files.

In addition to log files, files downloaded from the root site that grant or deny permission to spiders to crawl portions of a web site, such as a "robots.txt" file, may be analyzed. These files delineate which web pages, links, and subsequent paths may or may not be crawled and similarly may or may not be included in a sitemap structure. Only those web pages where the crawler is invited to go are crawled (as more fully described below with reference to reference numeral 214). Before crawling begins, the robots.txt file is attempted to be retrieved and parsed and a data structure is created of all off-limits base URLs. The URLs appearing in the off-limits data structure is strictly adhered to once crawling begins. It should be noted that some web sites choose to not utilize a specific robots.txt file but instead individually mark web pages as off-limits by using a robots Meta tag in the HTML of the web page. The robots Meta tag informs the crawler that it should either not index and/or not follow this page and the links contained within the page. In accordance with embodiments of the present invention, any and all such identifiable permissions are followed.

It should be further noted that analysis is not limited to log and permission files. For instance, previous sitemaps may also be analyzed for structure or for gathering details of metadata. Thus, it will be understood and appreciated by those or ordinary skill in the art that the analysis indicated at block 212 is meant to be illustrative and not restrictive as there any other files from which relevant information may be gathered may be analyzed within the spirit and scope of embodiments of the present invention.

Subsequently, as indicated at block 214, the permissible web pages having the same domain as the web site URL are crawled. In embodiments, the permissible web pages are crawled in a traditional manner by loading the web page URL and the log file analysis (block 212). Each link on the web page is examined to see if the link has already been crawled. If it has not, the link is followed. This process is repeated until all the web pages have been examined and, effectively, the tree of pages comprising the web site structure has been crawled. During web page crawling, relevant data items are gathered about the web site, that is, data items that may aid in generating the sitemap file. One such data item is the web page URL itself. The URL is the primary piece of information and each unique URL gathered forms an entry in the sitemap file. Other data items may include, without limitation, link information. To enable later use in determining a priority value for the web page (as more fully described below with reference to FIG. 3), the number of links each web page has from other web pages having the same domain as the URL may be gathered, as well as the number of web pages having the same domain as the URL. The link counter may be incremented each time a new link to a URL is discovered during the crawling step.

Next, as indicated at block 216, a relational structure of the web site is determined by examining the relationships between each permitted web page having the same domain as the web site URL. Thus, the relational structure takes into account the web pages that are a part of the domain, as well as the interconnections between the web pages. Thus, a hierarchal "picture" of the web site starts to form in terms of links between web pages and the routes through which the web pages may be reached.

Next, as indicated at block 218, one or more items of metadata related to the web pages comprising the web site is analyzed. This metadata can constitute a variety of information associated with the web pages including, without limitation, the frequency at which a page is modified, the relative importance or priority ranking of the page, whether a site administrator or other user has manually altered the modification frequency and/or priority value, and the like. In embodiments, such metadata may be determined automatically and/or set manually by a user. The analysis of two portions of metadata, priority value and modification frequency, is described in further detail below with reference to FIGS. 3 and 4, respectively. However, this list is not meant to be exhaustive, but merely to show exemplary items of metadata that may be analyzed. Other examples would include plug-ins required by a page, file size of or associated with a page, whether access to a page requires a security login, and the like. Any and all such forms of metadata, and any combinations thereof, are contemplated to be within the scope of embodiments of the present invention.

Once the relational structure and metadata for a web site are known, a current sitemap of the web site is generated, as indicated at block 220. The generated sitemap may be created using a markup language, for example and not by way of limitation, extensible markup language (XML). Standard formats can be followed so that the sitemap conforms to protocols maximizing web site accessibility. As an example, the format offered as www.sitemap.org allows web users to provide a standard sitemap coded in XML conforming to protocols accepted by many major search engines.

Once the sitemap is generated, the sitemap file may be written to disk. The file may optionally be compressed, for instance, utilizing the gzip compression algorithm, as known to those of ordinary skill in the art. In this embodiment, the sitemap file generally must contain no more than 50,000 URLs and must be less than 10 MB in size before compression is applied (compression is used to reduce the upload time to the search engines). If the data for the sitemap has more than the 50,000 URLs or the sitemap file grows over the 10 MB file size limit, then multiple sitemap files may be created along with a sitemap index file. For legacy consideration, the user may also be provided with the capability to save the sitemap in a text format. Although considered legacy, some sites still utilize text-based sitemaps.

Once the file has been written, it may be desired to inform let one or more specified search engine know by transmitting the current, up-to-date sitemap that is generated. To inform a search engine of a sitemap change, the search engine can be "pinged" with the URL to the latest sitemap file or index, as desired.

If desired, methods in accordance with embodiments of the present invention may provide functionality for verifying a sitemap file by comparing the file to the standard format, e.g., XML format, for a sitemap. The file will either pass or fails. If the file fails, then a list of errors may be generated allowing the user to correct the sitemap format, for instance, prior to informing a search engine of the sitemap file.

Additionally, if desired, during the crawling of the web pages (as indicated at block 214, the HTML and page structure of each of the pages associated with the web site may be analyzed for search engine optimization opportunities. For instance, each web page may be compared against the top X (where X is a number that varies based on computing device performance) search engine optimization rules and suggestions may be offered to the web site owner of changes that may allow their site to better optimize page ranking within a search engine, or the like.

Utilizing the method 200, interaction necessary by a site administrator or webmaster is diminished. Rather than requiring extensive user input, information that is already available is combined with algorithms, discussed hereinafter, to systematically generate the sitemap file. Additionally, a site administrator or other user may generate the sitemap locally—that is as a client-oriented tool, rather than relying on a served application. In some embodiments, the above method can be incorporated into the generation and upkeep of a web site. Thus, modifications to the web site can lead to an automatically-generated sitemap that is current.

Figure 3:
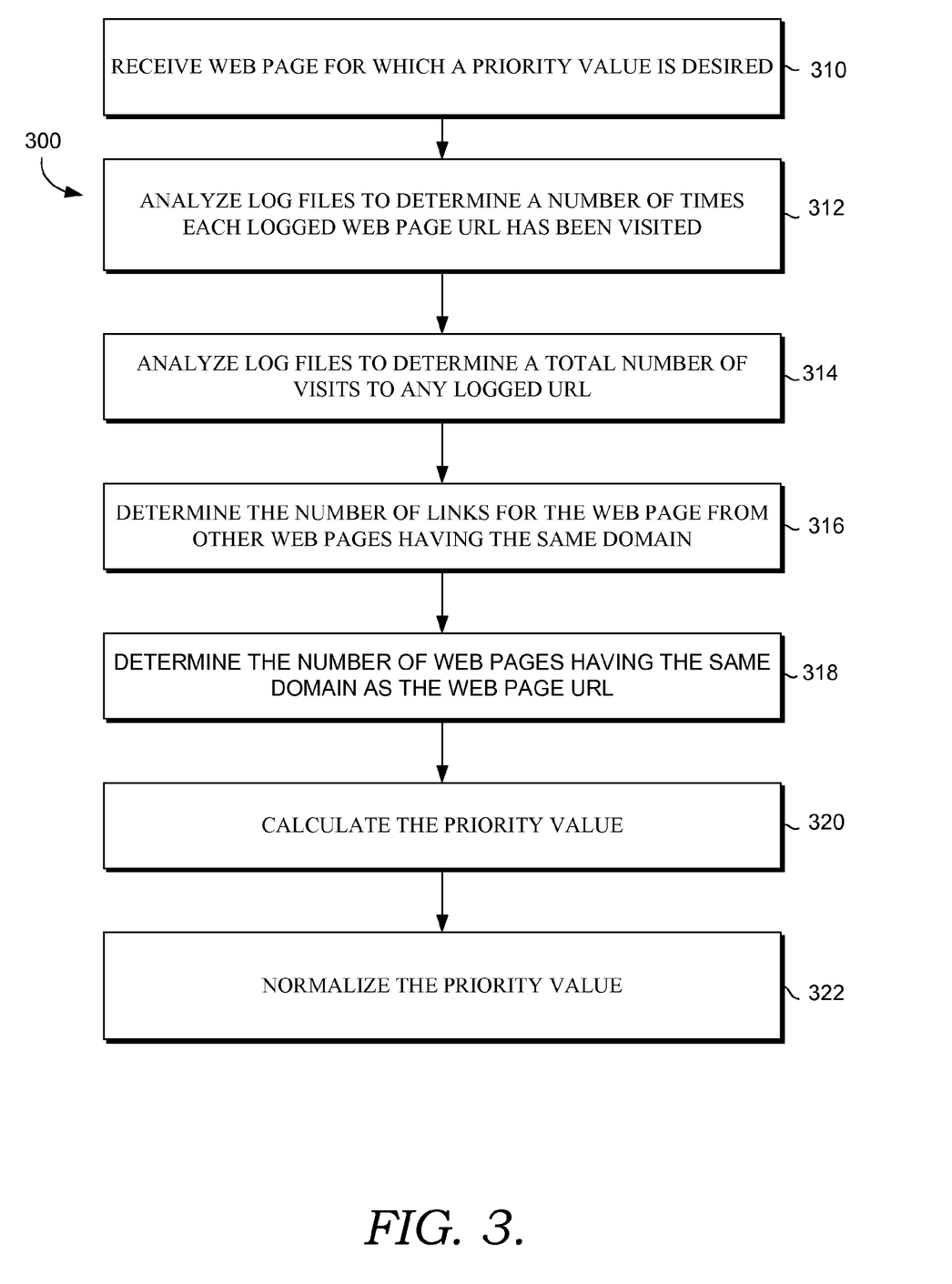
FIG. 3 is a flowchart of a method suitable for calculating a priority value for a web page, in accordance with an embodiment of the present invention.

Turning now to FIG. 3, a flow chart illustrating a method for determining a priority value for one or more web pages is shown and designated generally as reference numeral 300. Typically, the priority value is calculated during the metadata analysis step 218 of FIG. 2. Initially, as indicated at block 310, a web page for which a priority value is desired is received, typically via receipt of the web page URL. In embodiments, a priority value for each web page being crawled is determined and a specific indication that such value is desired for a particular web page is not necessary. Subsequently, the number of visits a particular web page has received, as well as the total number of log file entries (that is, a total number of visits to any URL logged in the log files) are determined, as indicated at blocks 312 and 314, respectively. Note that in embodiments, these values have already been determined as part of the log file analysis indicated at block 212 of FIG. 2 and, accordingly, at the time of the priority value calculation, are merely recalled. However, if one or more of these values was not determined as part of the log file analysis indicated at block 212 of FIG. 2, such values may be determined via log file analysis at or near the time the priority value is being calculated.

Referring back to FIG. 3, prior to, subsequent to, or contemporaneous with the metadata values gathered from the log files, the number of links the web page has from other web pages having the same domain as the URL, as well as the number of web pages having the same domain as the URL are determined, as indicated at blocks 316 and 318, respectively. Note that in embodiments, these values have already been determined as part of the crawling indicated at block 214 of FIG. 2 and, accordingly, at the time of the priority value calculation, are merely recalled. However, if one or more of these values was not determined as part of the crawling indicated at block 214 of FIG. 2, such values may be determined at or near the time the priority value is being calculated.

Once the relevant data items have been determined, a priority value is calculated, as indicated at step 320. In embodiments, such calculation may be performed utilizing the following formula:

$$\text{Priority} = \frac{URL \text{ link count}}{\text{Total number of } URL's} + \frac{URL \text{ log file count}}{\text{Total number of log file entries}}$$

Thus, the number of pages linked to the particular page as a proportion to the total pages in the domain and a proportion of visits to the page in proportion to total visits both help to determine that web page's priority ranking.

If desired, this value can be normalized to fall between zero and one so that standard values can be determined across multiple domains. This is indicated at block 322. In embodiments, the largest priority value may be utilized to calculate a multiplier to get the value equal to one. All priority values then may be multiplied by the multiplier to achieve a final priority value respectively therefore. It should be noted that a novel aspect of the present invention is the ability of a priority ranking to be generated for the sitemap file without user intervention. Thus, numerous calculations could fall within the scope and spirit of the invention. Once a priority value has been generated, however, user modification may be permitted, if desired. In embodiments, whether or not the value has been modified may be, in and of itself, a portion of the metadata associated with the web page that may be analyzed, for instance, at block 218 of FIG. 2, as well as the priority value itself.

Figure 4:
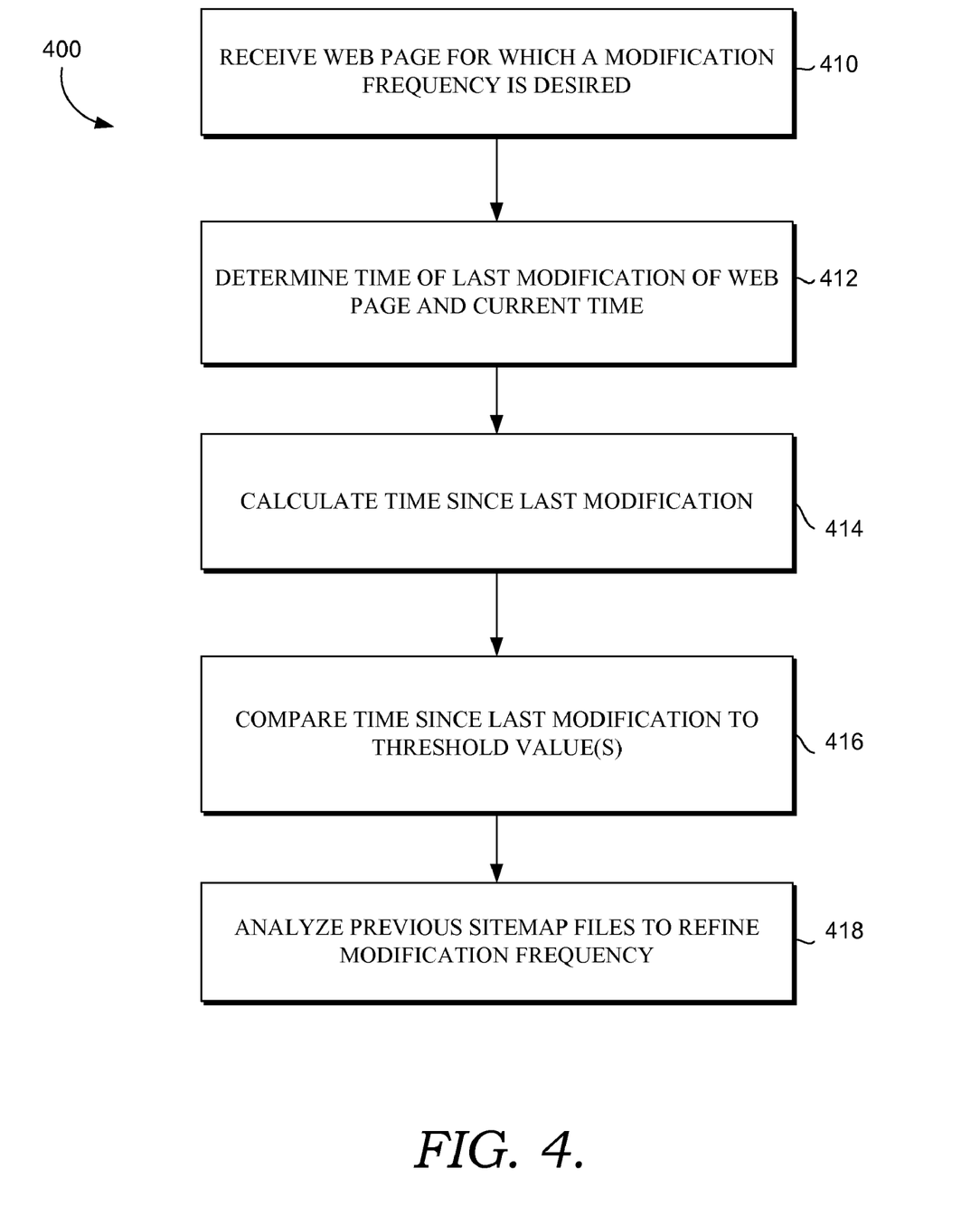
FIG. 4 is a flowchart of a method suitable for calculating a modification frequency for a web page, in accordance with an embodiment of the present invention.

Turning to the flowchart of FIG. 4, a flowchart illustrating a method for determining the frequency with which a web page is modified is shown, and designated generally as reference numeral 400. Typically, the modification frequency is calculated during the metadata analysis step 218 of FIG. 2. Initially, as indicated at block 410, a web page for which a modification frequency is desired is received, typically via receipt of the web page URL. In embodiments, a modification frequency for each web page being crawled is determined and a specific indication that such value is desired for a particular web page is not necessary. Subsequently, basic metrics of the web page are determined as indicated at block 412. These include, the time of the last modification to the web page, as well as a current time. To determine the value for the last modified time, it is necessary to look at the source for the web page. This step may not always be possible as it depends on how the web pages are generated. However, most web pages are generally stored as a file that is named the same as the page name in the URL (e.g., page.html, page.aspx, etc.).

Next, as indicated at block 414, the difference between the current time and last modification time is calculated to ascertain a time delta value. Once this delta value is known, it is compared with one or more preset threshold values, as indicated at block 416. The types of time periods and threshold values may vary according to variations in implementation. As an example, if the delta value is less than 24 hours old, the update frequency could be deemed to be daily, while a value less than 10 days old could be weekly. Values less than four hours and two months could be deemed hourly and monthly, respectively. Once again, these values are meant to convey illustration only and are not intended to limit the scope of embodiments of the present invention.

Next, as indicated at block 418, a previous sitemap may be analyzed to compare values and determine if refinements to the modification frequency are necessary. As an example, if a current value is very close to a threshold value, previous values could be used to determine in which frequency category a web page may be placed. Using an average of previous values with the current, calculated value may aid in producing a more accurate calculation with a larger sampling of modifications. Upon completion, a current update frequency value can be associated with the web page as another portion of metadata available for analysis, for instance, at block 218 of FIG. 2.

Figure 5:
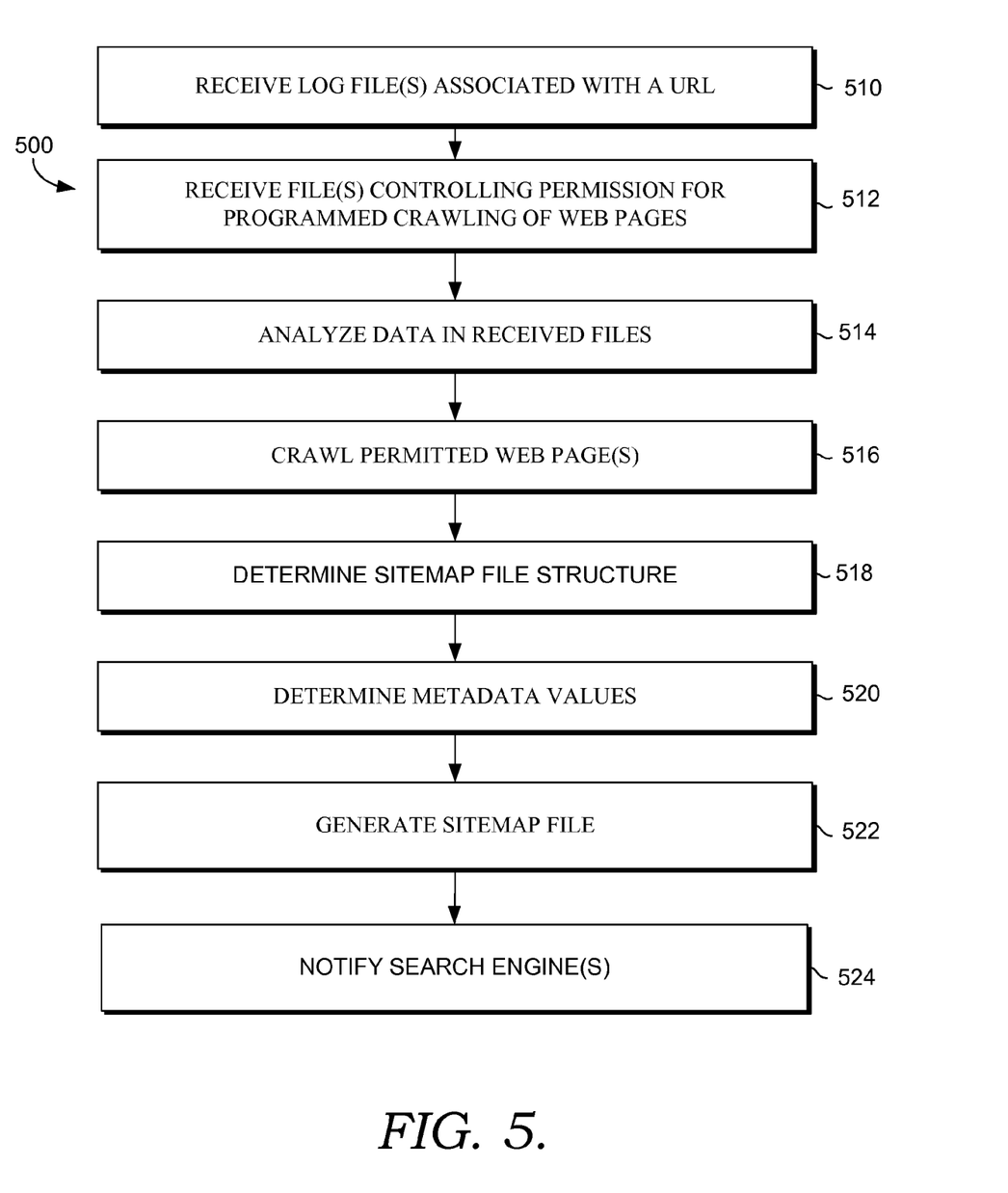
FIG. 5 is a flowchart of a method suitable for generating a sitemap file for a web site, in accordance with an embodiment of the present invention.

Referring now to FIG. 5, a flow chart illustrating a method for generating a sitemap and notifying search engines of such sitemap is shown and designated generally as reference numeral 500. Initially, as indicated at block 510, one or more log files associated with the URL for which sitemap generation is desired are received. Likewise, one or more files controlling permission for programmed crawling of the web pages having the same domain as the web site URL are received, as indicated at block 512. Next, data in the received files in analyzed to determine which web pages have not been previously crawled and for which of the non-crawled subset of web pages crawling is permitted. This is indicated at block 514. The permitted web pages are then crawled, as indicated at block 516.

Subsequently, the sitemap file structure is determined, as indicated at block 518, for instance, by analyzing the relationships between web pages having the same domain as the web site URL. Likewise, metadata values, including, without limitation, priority values and modification frequencies, are determined. This is indicated at block 520. Utilizing the file structure, metadata values and any other relevant data items, a sitemap file for the web site is subsequently generated, as indicated at block 522. If desired, one or more specified search engines may be notified, as indicated at block 524.

Figure 6:
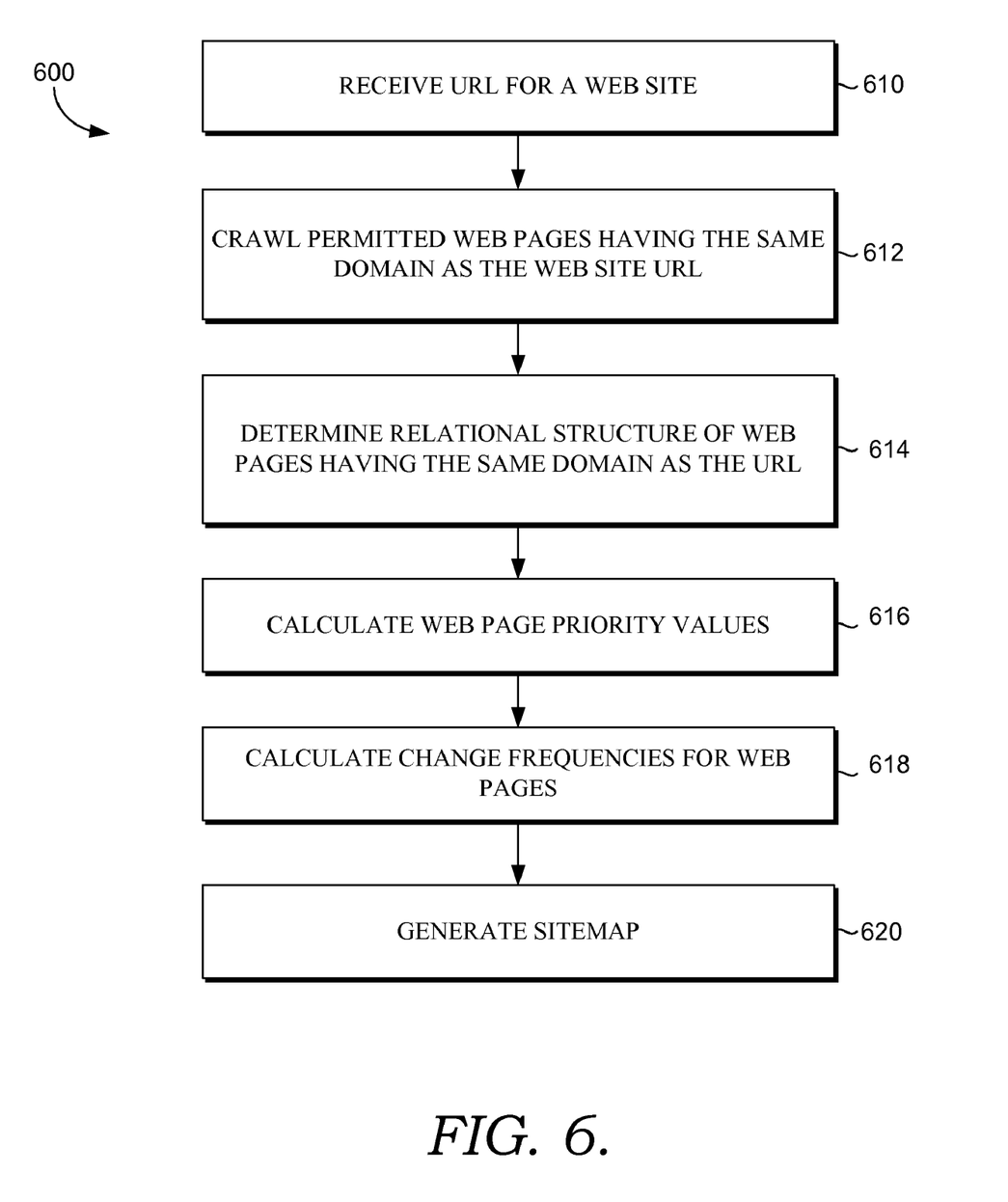
FIG. 6 is a flowchart of a method suitable for generating a sitemap for a web site, in accordance with an embodiment of the present invention.

With reference now to FIG. 6, a flow chart illustrating a method for generating a sitemap, in accordance with an embodiment of the present invention, is shown and designated generally as reference numeral 600. Initially, as indicated at block 610, the URL for a web site for which sitemap generation is desired in received. Generally, such receipt comprises receiving the URL for the web site, although it will be understood by those of ordinary skill in the art that any web site identifier from which the web site URL may be ascertained may be received in accordance with embodiments hereof. Subsequently, the web pages having the same domain as the web site URL are crawled in accordance with log file and control permissions, as described hereinabove with reference to FIG. 2. Next, as indicated at block 612, permitted web pages having the same domain as the web site URL are crawled. Once all permitted web pages have been crawled, a relational structure of the web pages is determined, as indicated at block 614.

Subsequently, as indicated at block 616, web page priority values for each permitted web page associated with the web site are calculated, for instance, utilizing the method described with reference to 3. Likewise, as indicated at block 618, a change or modification frequency for each web page associated with the web site is calculated, for instance, utilizing the method described with reference to FIG. 4. Subsequently, utilizing the relational structure, priority values, modification frequencies and any other relevant data items, a sitemap is generated, as indicated at block 620.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage media having computer-executable instructions embodied thereon for performing a method for automated sitemap generation, the method comprising:

receiving a universal resource locator (URL) of a web site for which a sitemap is to be generated;

analyzing one or more files that log user visits to web pages based on respective URLs to determine if the URL of the web site has been previously crawled;

upon determining the URL of the web site has not been previously crawled, crawling at least one web page having a same domain as the web site URL in accordance with control permissions associated with the at least one web page to determine one or more data items relevant to generating the sitemap for the web site;

determining a relational structure of a plurality of web pages having the same domain as the web site URL, including the at least one web page, wherein the relational structure comprises interconnections between the web pages of the plurality of web pages;

for each respective web page of the plurality of web pages, determining a priority value that is incorporated as an item of metadata, the priority value calculated according to the formula:

$$\text{Priority} = \frac{URL \text{ link count}}{\text{Total number of } URL's} + \frac{URL \text{ log file count}}{\text{Total number of log file entries}}$$

(1) wherein URL link count is a number of links the web page has from other web pages having the same domain as the URL, (2) wherein total number of URLs is a number of web pages having the same domain as the URL, (3) wherein URL log file count is a total number of visits the particular web page has received, and (4) wherein total number of log file entries is a total number of visits to web pages having the same domain as the URL;

for each respective web page of the plurality of web pages analyzing one or more additional values besides the priority value that are incorporated as items of metadata respectively related to the plurality of web pages;

generating a current sitemap utilizing the web site URL, the one or more data items, the relational structure and the items of metadata, wherein an updated sitemap is generated each time a web page of the plurality of web pages is modified;

verifying that the current sitemap conforms to a standard XML format for a sitemap, wherein a list of errors is generated if the current sitemap does not conform to the standard XML format for a sitemap; and incident to receiving verification that the current sitemap conforms to the standard XML format for a sitemap, notifying one or more internet search engines of the current sitemap.

2. The media of claim 1, wherein analyzing one or more files includes one or more of determining a number of times each logged web page URL has been visited, and a total number of visits to any URL logged in the one or more files.

3. The media of claim 2, wherein the one or more data items relevant to generating the sitemap for the web site include one or more of a number of links each crawled web page having the same domain as the URL has from other web pages having the same domain as the URL, and a number of web pages having the same domain as the URL.

4. The media of claim 1, further comprising normalizing the respective calculated priority values for each web page having the same domain as the web site URL.

5. The media of claim 1, wherein the priority value for each respective web page is capable of being manually modified.

6. The media of claim 1, wherein analyzing the one or more additional values comprises determining a frequency at which each web page having the same domain as the URL has been modified.

7. The media of claim 6, wherein the frequency is determined by determining a last-modified time, comparing a current time to the last modified time to calculate an elapsed time, and comparing the elapsed time to a set of threshold values.

8. The media of claim 7, wherein the method further comprises analyzing one or more previous sitemap files associated with the web site URL to determine a history of modified dates for each web page having the same domain as the URL and determining if the frequency should be updated in accordance with the history of modified dates.

9. The media of claim 1, wherein the current sitemap file is an extensible markup language (XML) file.

10. A method for automatically generating a sitemap file at a client device, the method comprising:

receiving one or more web server log files associated with a universal resource locator (URL);

receiving one or more files controlling permission for programmed crawling of a plurality of web pages having a same domain as the URL;

analyzing data in the one or more web server log files and one or more permission-control files;

crawling one or more permitted web pages of the plurality of web pages;

determining a sitemap file structure for the URL based upon a relational structure of the plurality of web pages, wherein the relational structure comprises interconnections between the web pages of the plurality of web pages;

for each respective web page of the one or more permitted web pages, determining a priority value that is incorporated as an element of metadata, the priority value calculated according to the formula:

$$\text{Priority} = \frac{URL \text{ link count}}{\text{Total number of } URL's} + \frac{URL \text{ log file count}}{\text{Total number of log file entries}}$$

(1) wherein URL link count is a number of links the web page has from other web pages having the same domain as the URL,
   (2) wherein total number of URLs is a number of web pages having the same domain as the URL,
   (3) wherein URL log file count is a total number of visits the particular web page has received, and
   (4) wherein total number of log file entries is a total number of visits to web pages having the same domain as the URL;

for each respective web page of the one or more permitted web pages, determining one or more additional values besides the priority value that are incorporated as an elements of metadata;

generating a sitemap file that includes the sitemap file structure and respective elements of metadata for each of the one or more permitted web pages; and notifying one or more search engines of the sitemap file.

11. The method of claim 10, wherein the sitemap file is an extensible markup language (XML) file.

12. The method of claim 10, wherein the method is performed without user intervention incident to any structural modification to the web site.

13. The method of claim 10, further comprising identifying one or more opportunities for search engine optimization from one or more of analyzing data in the one or more log files and one or more permission-control files, determining the sitemap file structure for the URL, and calculating one or more values that are incorporated as elements of metadata.

14. A computer system embodied on one or more computer-storage media having computer-executable instructions embodied thereon for performing a method for automatically generating sitemap metadata, the system comprising:

receiving a universal resource indicator (URL) for a web site comprising a plurality of web pages having a same domain as the URL for the website;

based on the URL received, crawling each web page of the plurality of web pages that does not restrict programmed crawling;

determining a relational structure of the plurality of web pages, wherein the relational structure comprises interconnections between the web pages of the plurality of web pages;

without intervention from a user, calculating a priority value for each web page having the same domain as the web site URL, the priority value calculated according to the formula:

$$\text{Priority} = \frac{URL \text{ link count}}{\text{Total number of } URL's} + \frac{URL \text{ log file count}}{\text{Total number of log file entries}}$$

(1) wherein URL link count is a number of links the web page has from other web pages having the same domain as the URL,
   (2) wherein total number of URLs is a number of web pages having the same domain as the URL,
   (3) wherein URL log file count is a total number of visits the particular web page has received, and
   (4) wherein total number of log file entries is a total number of visits to web pages having the same domain as the URL;

without intervention from the user, determining a frequency of change for each crawled web page of the plurality of web pages the frequency of change determined by:
   (1) calculating a current time delta value for the web page by finding a difference between a current time and a last modification time for the web page,
   (2) comparing the current time delta value to preset threshold values for the web page, and
   if the current time delta value is essentially equal to the preset threshold value for the web page, averaging the current time delta value and previous time delta values, the previous time delta values obtained from previous sitemaps for the web page; and generating a sitemap that includes the relational structure of the plurality of web pages, the priority value for each crawled web page, any indication that the priority value has been manually modified for each crawled web page, the frequency of change of each crawled web page, and any indication that the frequency of change has been manually modified for each crawled web page.

* * * * *

UNITED STATES PATENT AND TRADEMARK OFFICE
CERTIFICATE OF CORRECTION

| | | |
|---|---|---|
| PATENT NO. | : 8,126,869 B2 | Page 1 of 1 |
| APPLICATION NO. | : 12/028502 | |
| DATED | : February 28, 2012 | |
| INVENTOR(S) | : Hollier et al. | |

It is certified that error appears in the above-identified patent and that said Letters Patent is hereby corrected as shown below:

Title Page Item (75), under "Inventors" column 1, line 1, delete "Ket, WA (US);" and insert -- Kent, WA (US); --, therefor.

In the Specification

In column 6, line 45, delete "served" and insert -- server --, therefor.

In the Claims

In column 11, line 40, In Claim 14, delete "indicator" and insert -- locator --, therefor.

Signed and Sealed this
Third Day of February, 2015

Michelle K. Lee
*Deputy Director of the United States Patent and Trademark Office*